United States Patent
Ishida (10) Patent No.: US 9,641,706 B2
(45) Date of Patent: May 2, 2017

(54) IMAGE FORMING APPARATUS, SERVER BOARD, AND METHOD FOR CONTROLLING THE IMAGE FORMING APPARATUS

(71) Applicant: KYOCERA Document Solutions Inc., Osaka (JP)

(72) Inventor: Takayuki Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/148,673

(22) Filed: May 6, 2016

(65) Prior Publication Data
US 2016/0337535 A1 Nov. 17, 2016

(30) Foreign Application Priority Data

May 11, 2015 (JP) ................................ 2015-096542

(51) Int. Cl.
*G06F 3/12* (2006.01)
*H04N 1/00* (2006.01)

(52) U.S. Cl.
CPC ..... *H04N 1/00344* (2013.01); *H04N 1/00891* (2013.01); *H04N 1/00896* (2013.01); *H04N 2201/0039* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 6,304,926 B1 * | 10/2001 | Itezono | ...................... | G06F 1/08 710/63 |
| 6,611,350 B1 * | 8/2003 | Watanabe | ............. | G06F 3/1204 358/1.1 |
| 7,184,976 B1 * | 2/2007 | Kumagai | ............... | G06Q 30/04 705/32 |
| 2009/0097062 A1 * | 4/2009 | Hayashi | ................ | G06F 3/1222 358/1.15 |
| 2012/0023551 A1 | 1/2012 | Kawasumi | ........................ | 726/3 |
| 2015/0074365 A1 * | 3/2015 | Uehara | .................... | G06F 1/263 711/162 |
| 2015/0369783 A1 * | 12/2015 | Hamada | ............. | G01N 33/0062 702/24 |

FOREIGN PATENT DOCUMENTS

JP 2012-27520 A 2/2012

* cited by examiner

*Primary Examiner* — Jerome Grant, II
(74) *Attorney, Agent, or Firm* — Stein IP, LLC (57) ABSTRACT

An image forming apparatus includes an extension connection portion, a server board that is mounted to the extension connection portion and communicates, via an external communication port, with a management server that is provided at an exterior, a communication control portion that communicates, by using an internal communication port, with a collection object apparatus that is connected to a local network and from which information is to be collected, and a control portion that performs control so that the communication control portion collects predetermined apparatus information from the collection object apparatus and so that the server board transmits the apparatus information thus collected toward the management server.

11 Claims, 5 Drawing Sheets

IMAGE FORMING APPARATUS, SERVER BOARD, AND METHOD FOR CONTROLLING THE IMAGE FORMING APPARATUS

This application is based upon and claims the benefit of priority from the corresponding Japanese Patent Application No. 2015-096542 filed on May 11, 2015, the entire contents of which are incorporated herein by reference.

BACKGROUND

The present disclosure relates to an image forming apparatus that collects information on an apparatus for operation and maintenance.

An image forming apparatus such as a multi-functional peripheral, a copier, or a printer is installed in a client's company or office. For such an image forming apparatus, there is a service to provide a client with information related to operation and maintenance of the image forming apparatus. For example, a client is provided with a notification that a member as part of the image forming apparatus is approaching the end of its life or a notification that a remaining amount of a consumable item such as toner has become low. In order to provide such a service, a server of a service provider may be connected to the image forming apparatus of each client via a network such as the Internet.

There is known the following technique focused on information security between a server and each image forming apparatus. To be specific, an image processing system has an external system and an internal system that are connected to each other by way of a prescribed data transmission path. The external system includes a first information processing device that manages highly public information as external information and provides a software service. The internal system includes a second information processing device that manages highly confidential information as internal information and a third information processing device that outputs provision information provided by the software service. The first information processing device transmits an information generation module that generates the provision information to an acquisition request source and thus provides an information generation function thereto. The third information processing device receives the information generation module from the first information processing device and thus acquires the information generation function. Furthermore, the third information processing device executes the information generation module to generate the provision information by using the external information acquired from the first information processing device and the internal information acquired from the second information processing device. This configuration is such that an external management server does not collect internal information on a user environment.

As mentioned above, there may be a case where various types of information is collected from a client's image forming apparatus and accumulated in an external server. Collected are pieces of information related to actual usage of each image forming apparatus owned by a client, such as errors that have occurred, the number of printed sheets that have been made, and a length of time in which the image forming apparatus has been used. The pieces of information thus collected can be used for management (maintenance) of the image forming apparatus, as a result of which the client can be provided with useful information. There may also be a case where collected information is statistically analyzed to, for example, discover an error likely to happen, and in this manner, the information is used for development of an image forming apparatus.

In recent years, a local network is often constructed within a particular range as a unit, such as a company, a public office, a department, or an office. Once a PC of each user and an image forming apparatus have been connected to a local network (LAN), data can be transmitted from the PC of each user to the image forming apparatus via the LAN to be printed out. It is also possible to transmit image data generated at the image forming apparatus to the PC via the LAN. As described above, there may be a case where an image forming apparatus is connected to a PC of each user by way of a LAN.

In a case where an image forming apparatus is connected to a LAN, a server on the LAN, which manages the image forming apparatus, such as an in-house server, may execute an application for collecting information on each image forming apparatus. In this case, the information on each image forming apparatus is once collected in the server. Then, from the server on the LAN, the information on each image forming apparatus thus collected is transmitted to an external server.

This scheme, however, is problematic in that, in order to collect information on an image forming apparatus, it may be required to provide at least one server in the LAN. Providing a server increases an installation cost and requires an installation space.

Also in the above-mentioned known technique, in one internal network, there are provided at least three types of information processing devices including a server. It is, therefore, impossible to solve the problems of an installation cost and an installation space, which are entailed in providing a server.

SUMMARY

An image forming apparatus according to one aspect of the present disclosure includes an extension connection portion, a server board, a communication control portion, and a control portion. To the extension connection portion, a board is mounted. The server board is mounted to the extension connection portion, includes an external communication port and a circuit that is used for communication with an exterior, and communicates, via the external communication port, with a management server that is provided at the exterior. The communication control portion includes an internal communication port connecting to a local network different from a network to which the server board is connected, and communicates with a collection object apparatus that is connected to the local network and from which information is to be collected. The control portion performs control so that the communication control portion collects predetermined apparatus information from the collection object apparatus and so that the server board transmits the apparatus information thus collected toward the management server.

A server board according to another aspect of the present disclosure is mounted to an extension connection portion that is a portion for mounting a board thereto and is provided in the image forming apparatus. The server board includes an external communication port and a circuit that is used for communication with an exterior. The server board communicates, via the external communication port, with a management server that is provided at the exterior. The server board transmits, toward the management server, predetermined apparatus information collected, by the image forming apparatus, from a collection object apparatus that is communicable therewith by way of a local network.

A method for controlling an image forming apparatus according to another aspect of the present disclosure includes steps of mounting a server board to an extension connection portion for mounting a board thereto, which is provided in an image forming apparatus, controlling the server board to communicate with a management server that is provided at an exterior, connecting to a local network different from a network to which the server board is connected, communicating with a collection object apparatus that is connected to the local network and from which information is to be collected, collecting predetermined apparatus information from the collection object apparatus, and controlling the server board to transmit the apparatus information thus collected toward the management server.

Further features and advantages of the present disclosure will become apparent from the description of an embodiment given below.

DETAILED DESCRIPTION

Based on FIG. 1 to FIG. 5, the following describes an embodiment of the present disclosure. The present disclosure circumvents the need to provide one independent stationary server in a local network. It is intended that, while an installation cost of a server is suppressed, without the need to secure an installation space for a server, information on each image forming apparatus can be collected and transmitted to an exterior. This embodiment is described by using, as an example, a multi-functional peripheral 100 (corresponding to an image forming apparatus) to which a server board 1 is mounted. The multi-functional peripheral 100 has a normal mode and a power saving mode in which power consumption is decreased to lower than that in the normal mode. It should be noted, however, that various factors including a configuration and an arrangement, which are described in this embodiment, do not limit the scope of the disclosure thereto and are merely illustrative examples.

(Outline of Multi-Functional Peripheral 100)

Figure 1:
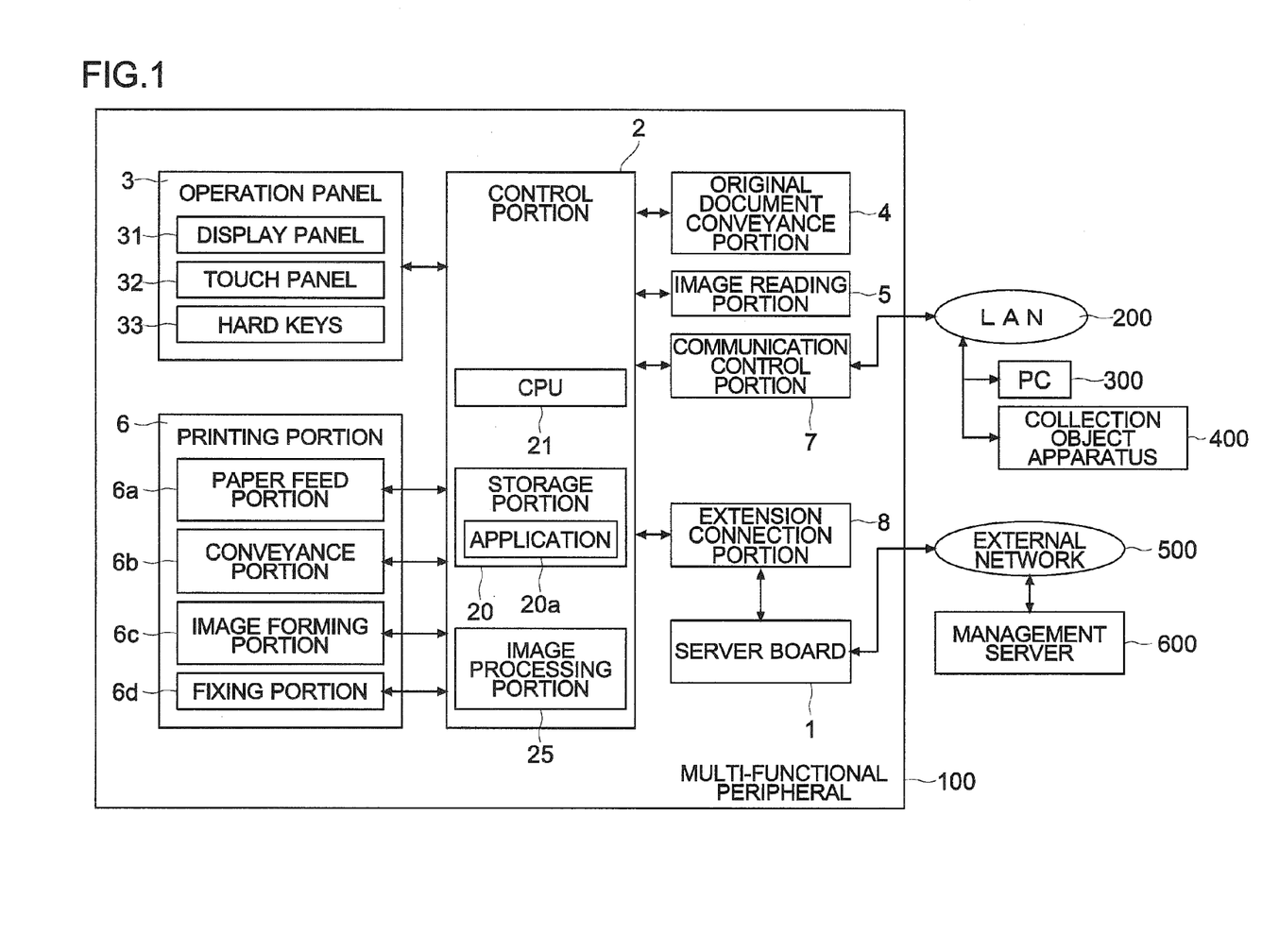
FIG. 1 is a diagram showing one example of a multi-functional peripheral according to an embodiment.

Next, based on FIG. 1, a description is given of an outline of the multi-functional peripheral 100 according to the embodiment.

As shown in FIG. 1, the multi-functional peripheral 100 includes a control portion 2. The control portion 2 includes circuits such as a storage portion 20, a CPU 21, and an image processing portion 25. The storage portion 20 is a combination of storage devices such as a ROM 22, a RAM 23, and an HDD 24 (see FIG. 2). The storage portion 20 stores various types of control programs and various types of data such as control data and image data. Based on the programs and data stored in the storage portion 20, the CPU 21 performs control of various portions of the multi-functional peripheral 100 and various types of computation processing. With respect to image data to be used for printing or transmission, the image processing portion 25 performs image processing such as concentration conversion, enlargement, reduction, rotation, and data format conversion. The image data that thus has undergone the image processing is used for toner image formation at an image forming portion 6c or transmission.

As shown in FIG. 1, the multi-functional peripheral 100 includes an operation panel 3. The operation panel 3 includes a display panel 31 that displays a status of the multi-functional peripheral 100, various types of messages, and various types of setting screens. With respect to the display panel 31, a touch panel 32 is provided. The touch panel 32 is intended to detect a position touched by a user and outputs a voltage (signal) corresponding to the position thus detected. Furthermore, the operation panel 3 is provided also with a plurality of hard keys 33 such as a start key and a ten-key numeric keypad.

The control portion 2 controls display on the operation panel 3. Based on an output of the touch panel 32, the control portion 2 recognizes that a touch has been made on the touch panel 32 and also recognizes a pressed position and pressed coordinates thereof on the display panel 31 (touch panel 32). Based on an output of the touch panel 32, the control portion 2 recognizes an operation image pressed (an image such as a soft key, a button, a tab, or a check box). Then, the control portion 2 performs control so that display on the display panel 31 is switched depending on an operation performed.

The control portion 2 is communicably connected to the operation panel 3. The operation panel 3 passes a user's setting made on the operation panel 3 to the control portion 2. The control portion 2 controls respective operations of the various portions constituting the multi-functional peripheral 100, such as an original document conveyance portion 4, an image reading portion 5, a printing portion 6, a communication control portion 7, and the server board 1 so that the various portions operate in accordance with the user's setting.

The multi-functional peripheral 100 includes the original document conveyance portion 4 and the image reading portion 5. The original document conveyance portion 4 continuously and automatically conveys, one by one, a set original document toward a feed-reading contact glass (reading position, not shown). The image reading portion 5 reads an original document passing through the feed-reading contact glass or an original document set on a place-reading contact glass (not shown) and generates image data. The control portion 2 is connected to each of the original document conveyance portion 4 and the image reading portion 5 by way of a signal line such as a bus. Further, in a job such as scanning, printing, or transmission, the control portion 2 controls respective operations of the original document conveyance portion 4 and the image reading portion 5.

The multi-functional peripheral 100 includes the printing portion 6 (a paper feed portion 6a, a conveyance portion 6b, the image forming portion 6c, and a fixing portion 6d) that performs printing. The paper feed portion 6a houses a plurality of paper sheets and, at the time of performing printing, feeds out the paper sheets one by one to the conveyance portion 6b. The conveyance portion 6b conveys a paper sheet supplied from the paper feed portion 6a. Based on image data, the image forming portion 6c forms a toner image, and transfers the toner image onto a paper sheet conveyed thereto. The fixing portion 6d fixes a toner image that has been transferred onto a paper sheet. A paper sheet onto which toner has been fixed is ejected onto an ejection tray (not shown). Furthermore, the control portion 2 is connected to the printing portion 6 by way of a signal line such as a bus. Further, in a job involving printing, the control portion 2 controls an operation of the printing portion 6.

The multi-functional peripheral 100 includes the communication control portion 7. Via a local network (LAN 200) such as an in-house network, the communication control portion 7 is communicably connected to a PC 300. Furthermore, one or a plurality of image forming apparatuses such as a printer, the multi-functional peripheral 100, and a facsimile apparatus may be connected to the LAN 200. Further, via the LAN 200, the communication control portion 7 is communicable with any other image forming apparatus connected to the LAN 200. Furthermore, the communication control portion 7 collects information from the any other image forming apparatus connected to the LAN 200. The any other image forming apparatus from which information is to be collected is referred to as a collection object apparatus 400.

The multi-functional peripheral 100 includes an extension connection portion 8 for mounting a board thereto. The extension connection portion 8 is a function expansion slot (bus interface). The extension connection portion 8 includes a plurality of terminals. The board is inserted into the extension connection portion 8, so that a power source line and a signal line for communicating with the control portion 2 are connected to a signal line of the board. The control portion 2 recognizes the board that thus has been inserted into the extension connection portion 8. The control portion 2 controls an operation of the board with which communication has been enabled. This description explains a case where the server board 1 is inserted into the extension connection portion 8.

(Detail of Multi-Functional Peripheral 100)

Figure 2:
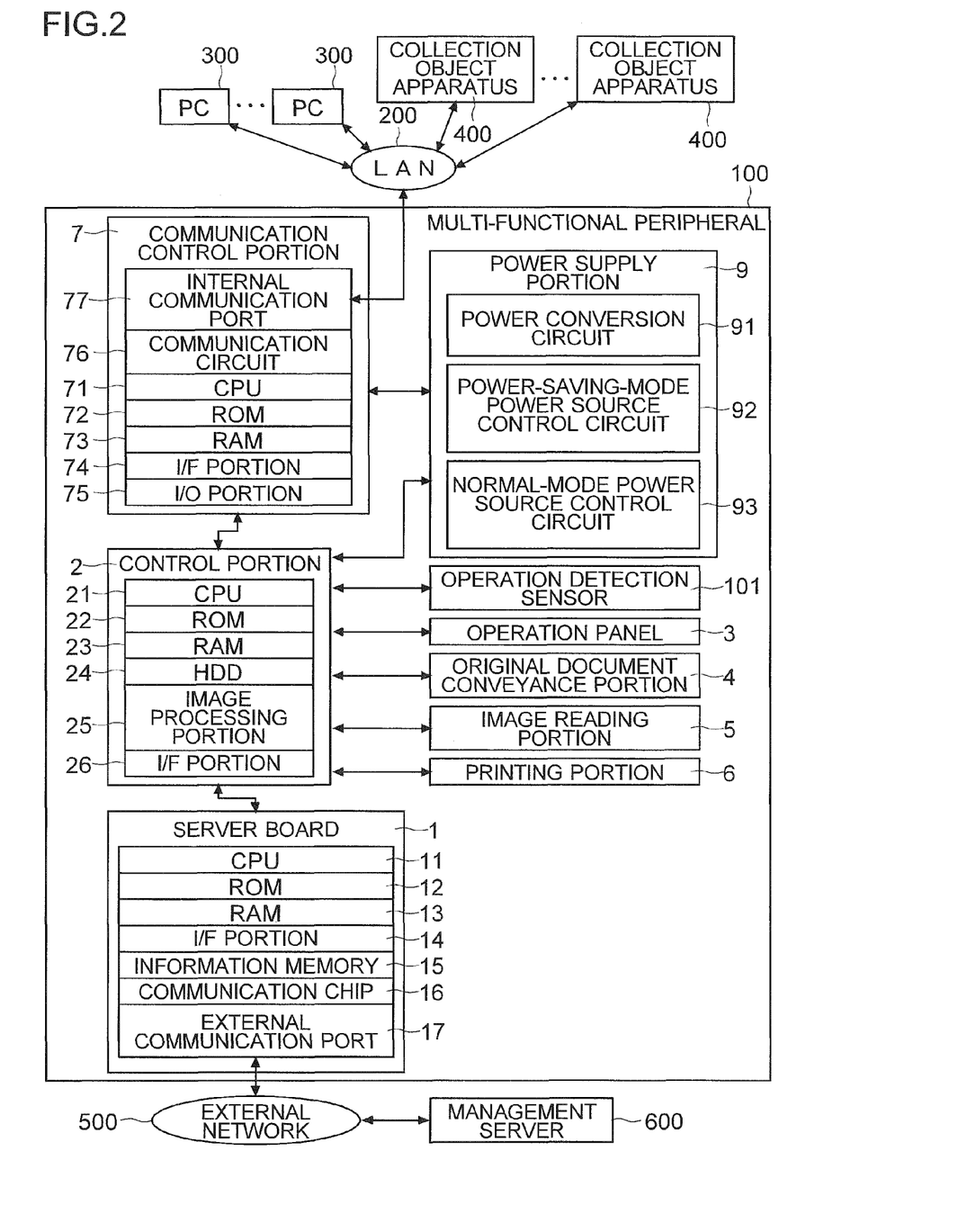
FIG. 2 is a diagram for explaining a detail of the multi-functional peripheral according to the embodiment.

Next, with reference to FIG. 2, a description is given of a detail of the multi-functional peripheral 100.

As shown in FIG. 2, the multi-functional peripheral 100 according to the embodiment includes the control portion 2, the communication control portion 7, the server board 1, and a power supply portion 9. The control portion 2 includes the circuits such as the CPU 21, the ROM 22, the RAM 23, the HDD 24, the image processing portion 25, and an I/F portion 26. The I/F portion 26 is an interface circuit for performing communication (exchange of signals) with the various portions of the multi-functional peripheral 100, such as the communication control portion 7, the power supply portion 9 (a detail of which will be described later), the operation panel 3, the original document conveyance portion 4, the image reading portion 5, the printing portion 6, and the server board 1.

The communication control portion 7 includes a CPU 71, a ROM 72, a RAM 73, an I/F portion 74, an I/O portion 75, a communication circuit 76, and an internal communication port 77. For the purpose of executing communication processing and communication programs related to the LAN 200, the CPU 71 performs computation processing and operation control of the communication control portion 7. The ROM 72 and the RAM 73 store programs and data related to communication processing with the PC 300 and the collection object apparatus 400 on the LAN 200. The I/F portion 74 is an interface for communicating with the control portion 2 and with the power supply portion 9. The I/O portion 75 is a portion that receives a signal for judging whether or not to release the power saving mode of the multi-functional peripheral 100. The communication circuit 76 is a circuit that actually exchanges signals with the PC 300 and the collection object apparatus 400 via the LAN 200, thereby performing transmission and reception of information (data) thereto and therefrom. The internal communication port 77 is a socket to which a network cable for LAN connection is connected, and a signal line from the communication circuit 76 is connected to the internal communication port 77.

The server board 1 includes a CPU 11, a ROM 12, a RAM 13, an I/F portion 14, an information memory 15, a communication chip 16, and an external communication port 17. For the purpose of executing communication processing and communication programs for communicating with an external network 500 such as the Internet and with a management server 600 via the external network 500, the CPU 11 performs computation processing and operation control of the server board 1. The ROM 12 and the RAM 13 store programs and data related to communication processing with the external network 500 and with the management server 600 that is a communication partner via the external network 500. The I/F portion 14 is an interface for communicating with the control portion 2.

The information memory 15 is a memory that accumulates therein apparatus information collected, by the communication control portion 7, from the collection object apparatus 400. The information memory 15 is a nonvolatile storage device such as an NVRAM. Even when the multi-functional peripheral 100 is in a main power off state, the information memory 15 retains the apparatus information. Apparatus information is information stored in a storage device in the collection object apparatus 400. A detail of apparatus information and collection and transmission of apparatus information will be described later.

The communication chip 16 is a circuit for communicating with the external network 500 such as the Internet. To be specific, a PHY chip can be used as the communication chip 16. The external communication port 17 is a socket to which a network cable is connected, and a signal line from the PHY chip is connected thereto. The server board 1 includes the external communication port 17 and the circuit that is used to communicate with the exterior (communication chip 16). Via the external communication port 17 and the external network 500, the server board 1 communicates with the management server 600 provided at the exterior. The management server 600 is a data server that collects and accumulates therein apparatus information on each image forming apparatus that is installed in a client's company.

The multi-functional peripheral 100 also includes the power supply portion 9. The power supply portion 9 receives power supply from a power source (not shown) such as a commercial power source. The power supply portion 9 includes a power conversion circuit 91, a power-saving-mode power source control circuit 92, and a normal-mode power source control circuit 93.

The power conversion circuit 91 rectifies power supplied from the power source and steps up and down a voltage thereof. Further, the power conversion circuit 91 generates a spec-specified drive voltage for each of the various types of circuits and elements in the control portion 2, the communication control portion 7, the server board 1, and the operation panel 3. There are a plurality of types of spec-specified drive voltages for each of the various types of circuits and elements, and thus the power conversion circuit 91 generates the plurality of types of voltages (for example, DC 5 V, 3.3 V, 2.5 V, 1.8 V). Furthermore, the power conversion circuit 91 also generates a voltage to be applied to a motor (for example, DC 24 V) or a circuit of a portion that executes a job, such as the original document conveyance portion 4, the image reading portion 5, or the printing portion 6. To be specific, the power conversion circuit 91 includes a plurality of circuits such as a switching power source, a rectification circuit, a step-up transformer, and a DC/DC converter.

The power-saving-mode power source control circuit 92 operates when in the power saving mode. In the power saving mode, power supply to a predetermined supply shut-off portion is shut off. The power-saving-mode power source control circuit 92 switches off a power supply control switch (not shown) that is provided with respect to the supply shut-off portion, thereby shutting off power supply to the supply shut-off portion. Meanwhile, the power-saving-mode power source control circuit 92 performs power supply to a portion to be supplied with power even in the power saving mode (leaves the portion electrically connected).

The normal-mode power source control circuit 93 operates in the normal mode. In the normal mode, power supply to the supply shut-off portion is performed. The normal-mode power source control circuit 93 maintains, in an on state, each switch that is provided with respect to the supply shut-off portion, thereby performing power supply to all the portions including the supply shut-off portion.

(Normal Mode and Power Saving Mode)

Figure 3:
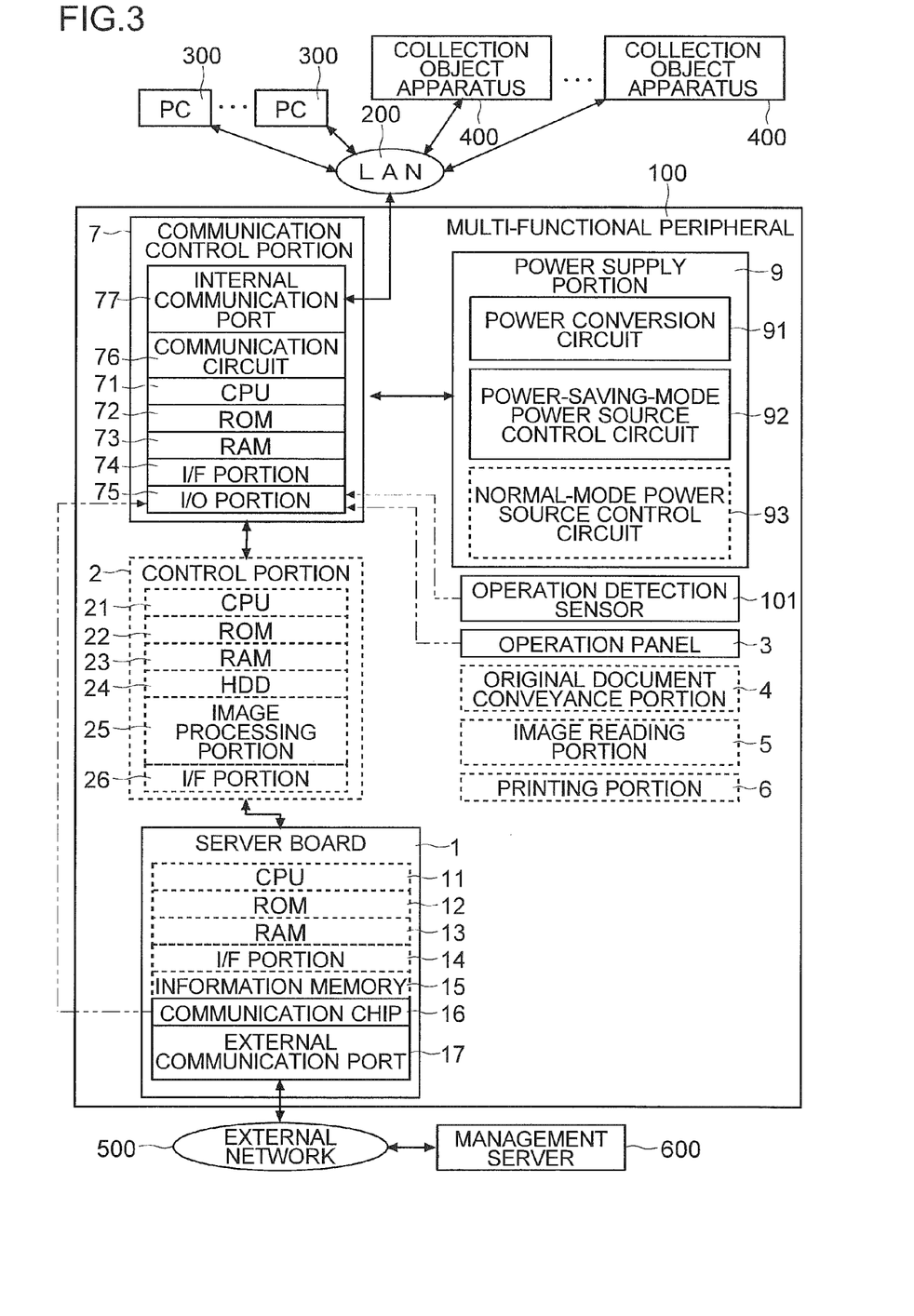
FIG. 3 is a diagram for explaining a power saving mode of the multi-functional peripheral according to the embodiment.

Next, with reference to FIG. 3, a description is given of how a transition is made between the normal mode and the power saving mode in the multi-functional peripheral 100 according to the embodiment. In FIG. 3, each portion enclosed by a broken line is one example of the portion power supply to which is shut off in the power saving mode.

The multi-functional peripheral 100 has the normal mode in which all jobs such as printing and transmission are maintained in an executable state. In the normal mode, the power supply portion 9 supplies power to all the portions of the multi-functional peripheral 100. For example, in the normal mode, the control portion 2 turns on/off a heater of the fixing portion 6d so as to maintain the fixing portion 6d at a fixing-enabled temperature. In the normal mode, however, even in a state where printing is not being performed (stand-by state), a certain level of power is consumed.

From the viewpoint of energy saving, it is required that not only instantaneous maximum power consumption but also power consumption in the stand-by state be decreased. To this end, when a transition condition to the power saving mode has been satisfied, the control portion 2 controls the multi-functional peripheral 100 to make a transition from the normal mode to the power saving mode. As the transition condition, there is used a condition that, for a certain length of time after completion of a job (for example, the CPU 21 of the control portion 2 counts a length of time of several minutes to several tens of minutes), the multi-functional peripheral 100 has not been operated nor received any input thereto or a condition that one of the hard keys 33, which is to provide an instruction to make a transition to the power saving mode, has been pressed.

The control portion 2 instructs the power supply portion 9 to make a transition to the power saving mode. This causes the power-saving-mode power source control circuit 92 to operate. As a result, power supply to the supply shut-off portion is shut off. FIG. 3 shows an example in which power supply to each of the control portion 2, the normal-mode power source control circuit 93, the original document conveyance portion 4, the image reading portion 5, the printing portion 6, and the circuits other than the communication chip 16 and the external communication port 17 in the server board 1 is shut off. This makes it possible to decrease power consumption of the multi-functional peripheral 100.

Even in the power saving mode, there is performed power supply to the communication control portion 7, an operation detection sensor 101, part of the operation panel 3 (the touch panel 32 and the hard keys 33), and the communication chip 16 and the external communication port 17 of the server board 1. During the power saving mode, the power supply portion 9 supplies power only to, among the plurality of circuits included in the server board 1, one(s) that recognize(s) that a command has been received from the management server 600 (perform(s) command reception processing).

In the power saving mode, the CPU 11, the ROM 12, and the RAM 13 of the server board 1 have been shut down, and data transmission programs and data, therefore, cannot be handled. For this reason, in a state where supplied power is limited due to the power saving mode, the server board 1 does not perform transmission of information such as apparatus information to the external network 500 and the management server 600.

The operation detection sensor 101 is a sensor that detects an operation with respect to the multi-functional peripheral 100. Examples of the operation detection sensor 101 can include a sensor that detects whether a maintenance cover provided at the multi-functional peripheral 100 is open or closed, a sensor that detects whether the original document conveyance portion 4 has ascended or descended, a sensor that detects an original document set on the original document conveyance portion 4, and a sensor that detects drawing out and mounting of a paper sheet cassette of the paper feed portion 6a.

Since power supply to the control portion 2 has been shut off, the communication control portion 7 judges whether or not a predetermined recovery condition has been satisfied. The communication control portion 7 is smaller in circuit scale and thus is less in power consumption than the control portion 2. Thus, during the power saving mode, compared with a case where power supply to part of the control portion 2 is continued or power supply to the control portion 2 is temporarily resumed, power consumption in the multi-functional peripheral 100 can be suppressed.

The recovery condition can be determined appropriately. As the recovery condition, there may be used a condition that the communication control portion 7 has received, from the PC 300, a job of printing (print job) such as image data and printing setting data or a signal providing an instruction to make a transition to the normal mode. Furthermore, as the recovery condition, there may be used a condition that an operation with respect to the touch panel 32 or the hard keys 33 has been performed. In this case, an output of the touch panel 32 or the hard keys 33 is inputted to the I/O portion 75 of the communication control portion 7. Furthermore, as the recovery condition, there may be used a condition that the operation detection sensor 101 has detected an operation by a user with respect to the multi-functional peripheral 100. Accordingly, an output of the operation detection sensor 101 also is inputted to the I/O portion 75 of the communication control portion 7.

As the recovery condition, there may be used a condition that a transmission request of apparatus information has been received from the management server 600. When, in the power saving mode, the communication chip 16 of the server board 1 has received a transmission request, the communication chip 16 transmits, to the I/O portion 75 of the communication control portion 7, a signal providing a notification that the recovery condition has been satisfied.

Based on the input signal to the I/O portion 75, the communication control portion 7 recognizes whether or not the recovery condition has been satisfied. When having judged that the recovery condition has been satisfied, the communication control portion 7 instructs the power supply portion 9 to make a transition to the normal mode. This causes the normal-mode power source control circuit 93 to start up. As a result, power supply to the supply shut-off portion is resumed, and warm-up processing is performed at the various portions of the multi-functional peripheral 100. Then, the multi-functional peripheral 100 is recovered to a state where all functions are available (normal mode).

(Collection and Transmission of Apparatus Information)

Figure 4:
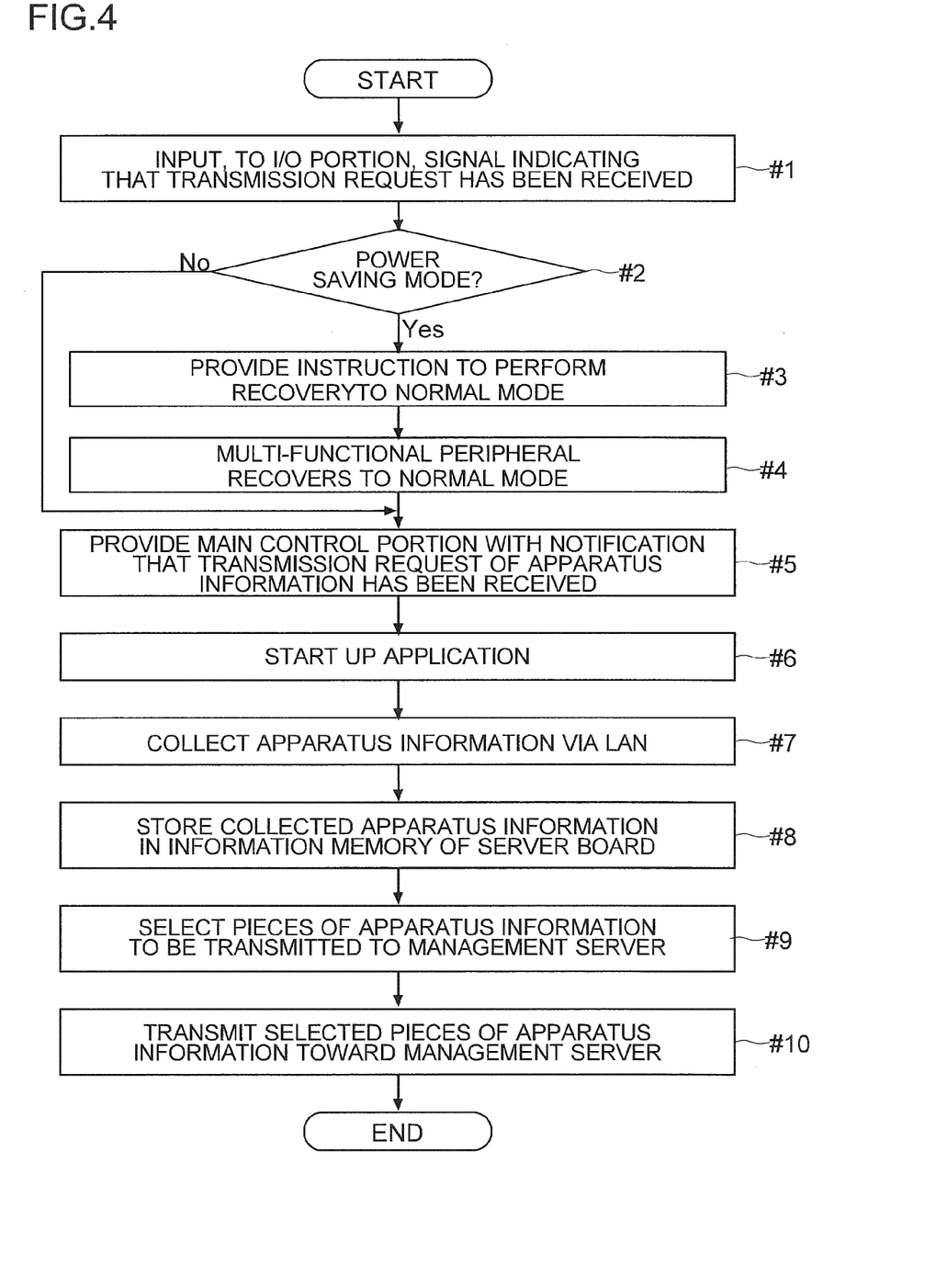
FIG. 4 is a flow chart showing one example of a flow of collection and transmission of apparatus information in the multi-functional peripheral according to the embodiment.

Next, with reference to FIG. 4, a description is given of a flow of collection and transmission of apparatus information in the multi-functional peripheral 100 according to the embodiment.

This description explains an example in which, based on a request from the management server 600, collection and transmission of apparatus information are performed. At a prescribed cycle such as once a week or once several days, the management server 600 issues a request to each of image forming apparatuses under its management. Furthermore, the description is directed to an example in which, immediately after being collected, apparatus information is transmitted to the management server 600. A configuration also may be adopted in which, at a time interval (for example, several hours to several days) after being collected, apparatus information is transmitted.

"START" in FIG. 4 refers to a time when the communication chip 16 of the server board 1 receives a transmission request of apparatus information from the management server 600. Upon receiving the transmission request, the communication chip 16 inputs, to the I/O portion 75 of the communication control portion 7, a signal indicating that the transmission request has been received (Step #1). Upon receiving this signal, the communication control portion 7 confirms whether the multi-functional peripheral 100 is in the normal mode or in the power saving mode (Step #2).

When the multi-functional peripheral 100 is in the power saving mode (Yes at Step #2), the communication control portion 7 judges that the recovery condition has been satisfied and thus instructs the power supply portion 9 to perform recovery to the normal mode (Step #3). Following this, the normal-mode power source control circuit 93 of the power supply portion 9 starts up to cause the multi-functional peripheral 100 to recover to the normal mode (Step #4). That is, during the power saving mode, when the server board 1 has received a transmission request of apparatus information from the management server 600, in order to bring the image forming apparatus to the normal mode, the power supply portion 9 resumes power supply to the supply shut-off portion.

When the multi-functional peripheral 100 is in the normal mode (No at Step #2) and after Step #4, the communication control portion 7 or the server board 1 provides the control portion 2 with a notification that a transmission request of apparatus information has been received (Step #5). Upon receiving this notification, in order to perform collection and transmission of apparatus information, the control portion 2 starts up an application 20a that is pre-installed in the storage portion 20 (Step #6, see FIG. 1). As a result of adding the server board 1 to the multi-functional peripheral 100, the application 20a is installed in the storage portion 20.

The control portion 2 operates the application 20a so that the communication control portion 7 collects, via the LAN 200, apparatus information from each of the collection object apparatuses 400 connected to the LAN 200 (Step #7). When a self apparatus (the multi-functional peripheral 100 according to the embodiment) is included in the collection object apparatuses 400, the control portion 2 performs control so that apparatus information stored in the ROM 22 and the HDD 24 is stored in the RAM 23.

The collection object apparatus 400 is constituted of a printing apparatus that is connected to the LAN 200 and from which information is to be collected. To be specific, as the collection object apparatus 400, there are used one, a plurality, or all of the multi-functional peripheral 100 and other image forming apparatuses (the multi-functional peripheral 100, a copier, a printer, and a facsimile apparatus) connected to the LAN 200 to which the multi-functional peripheral 100 is connected. A configuration also may be adopted in which, among the image forming apparatuses connected to the LAN 200, one(s) to be used as the collection object apparatus 400 can be chosen on the operation panel 3.

Apparatus information is data that is stored in the collection object apparatus 400. Apparatus information can include identification information of the collection object apparatus 400 (image forming apparatus) such as a model number and a serial number. Furthermore, apparatus information can include management information that is used for life management of various members in the collection object apparatus 400, such as a cumulative number of printed sheets, a cumulative length of driving time of the portion that performs printing, and errors that have occurred. Furthermore, apparatus information can include remaining amount information that indicates a remaining amount status of a consumable item used in the collection object apparatus 400, such as a remaining amount of toner and a remaining number of paper sheets. Furthermore, as one type of data backup, apparatus information can include content information such as image data used for a job in the collection object apparatus 400 and image data stored therein. Furthermore, as one type of data backup, apparatus information can include user information including a user's log-in user name and a password that are registered in the collection object apparatus 400 and personal information such as an address book stored in the collection object apparatus 400.

When the self apparatus is used also as the collection object apparatus 400, the storage portion 20 stores apparatus information having the above-mentioned contents. Furthermore, when the collection object apparatus 400 is constituted of an image forming apparatus other than the self apparatus, such an image forming apparatus connected to the LAN 200 stores and retains apparatus information. The control portion 2 controls the communication control portion 7 to collect apparatus information on one or a plurality of such image forming apparatuses.

The control portion 2 performs control so that the apparatus information thus collected is stored in a nonvolatile manner in the information memory 15 of the server board 1 (Step #8). Moreover, the control portion 2 selects, from among the pieces of apparatus information stored in the information memory 15, one(s) to be transmitted to the management server 600 (Step #9).

In the multi-functional peripheral 100 of this embodiment, in order to prevent leakage of confidential matters, the control portion 2 or the CPU 11 of the server board 1 excludes content information and personal information among the collected pieces of apparatus information, from the one(s) to be transmitted to the management server 600. The multi-functional peripheral 100 (server board 1) transmits, as apparatus information, among the above-mentioned collected pieces of apparatus information, identification information, management information, and remaining amount information to the management server 600. The control portion 2 or the CPU 11 of the server board 1 may exclude a particular piece(s) of information such as a serial number among pieces of information other than content information and personal information, from the one(s) to be transmitted to the management server 600.

In the storage portion 20 or the information memory 15, selection data is stored that defines, among collected pieces of apparatus information, one(s) to be transmitted to the management server 600 and one(s) not to be transmitted to the management server 600. Based on the selection data, with respect to each of the collection object apparatuses 400, the control portion 20 or the CPU 11 of the server board 1 generates apparatus information to be transmitted to the management server 600 and performs control so that the apparatus information thus generated is stored in the RAM 13 of the server board 1. The control portion 2 may control the communication control portion 7 to collect only a piece(s) of apparatus information to be transmitted (that can be transmitted) to the management server 600.

The control portion 2 controls the server board 1 to transmit the selected piece(s) of apparatus information on each of the collection object apparatuses 400 (image forming apparatuses) toward the management server 600 (Step #10). At this time, the control portion 2 controls the server board 1 to transmit, among the collected pieces of apparatus information (the pieces of information stored in the information memory 15), only one(s) predetermined as information that can be transmitted to the exterior (so determined based on the selection data) toward the management server 600. This flow is then completed.

After that, processing based on the piece(s) of apparatus information thus received is performed at the management server 600. The management server 600 performs an analysis of the received piece(s) of apparatus information. Then, the management server 600 transmits a result of the analysis to the server board 1 of the multi-functional peripheral 100. For example, with respect to each of the collection object apparatuses 400, the management server 600 transmits, to the server board 1, a notification about a member that is approaching the end of its life and thus needs to be replaced. Furthermore, with respect to each of the collection object apparatuses 400, the management server 600 transmits, to the server board 1, a notification about a consumable item whose remaining amount is low. Upon receiving such a notification, the control portion 2 controls the printing portion 6 to print a content of the notification. Furthermore, the control portion 2 may perform control so that the content of the notification is displayed on the display panel 31.

The foregoing description has explained an example in which, based on a transmission request of apparatus information from the management server 600, apparatus information on each image forming apparatus is collected and transmitted. The following describes modification examples.

Modification Example 1

A configuration may be adopted in which when the communication control portion 7 has received an instruction to collect and transmit apparatus information from any of the PCs 300 and the collection object apparatuses 400 connected to the LAN 200, the flow chart shown in FIG. 4 is executed. In other words, a configuration may be adopted in which an instruction to collect and transmit apparatus information can be provided from any apparatus in the LAN 200. In this case, such an instruction is directly inputted to the communication control portion 7, which monitors, in the power saving mode, whether or not the recovery condition to the normal mode has been satisfied, and thus Step #1 in the flow chart shown in FIG. 4 could be skipped.

Modification Example 2

Furthermore, a configuration may be adopted in which an instruction to collect and transmit apparatus information can be provided on the operation panel 3 of the multi-functional peripheral 100 to which the server board 1 is mounted. In the power saving mode, at a point in time when the operation panel 3 is operated, recovery to the normal mode is achieved, in which case, Step #1 to Step #4 in the flow chart shown in FIG. 4 could be skipped.

Modification Example 3

Furthermore, a configuration may be adopted in which setting (timer setting) of a date and time for performing collection and transmission of apparatus information can be performed on the operation panel 3 of the multi-functional peripheral 100 to which the server board 1 is mounted. In order that, even in the power saving mode, collection and transmission of apparatus information can be performed on a fixed date and time, a set collection date and time is pre-stored in the ROM 72 of the communication control portion 7. Furthermore, as the CPU 71 of the communication control portion 7, a CPU having a time counting function is used, or a time counting circuit is provided in the communication control portion 7. Further, the flow chart shown in FIG. 4 is set to start upon the set collection date and time being reached. In this case, the communication control portion 7 itself recognizes a start point in time of collection and transmission of apparatus information, and thus Step #1 in the flow chart shown in FIG. 4 could be skipped.

(Setting on Operation Panel 3)

Figure 5:
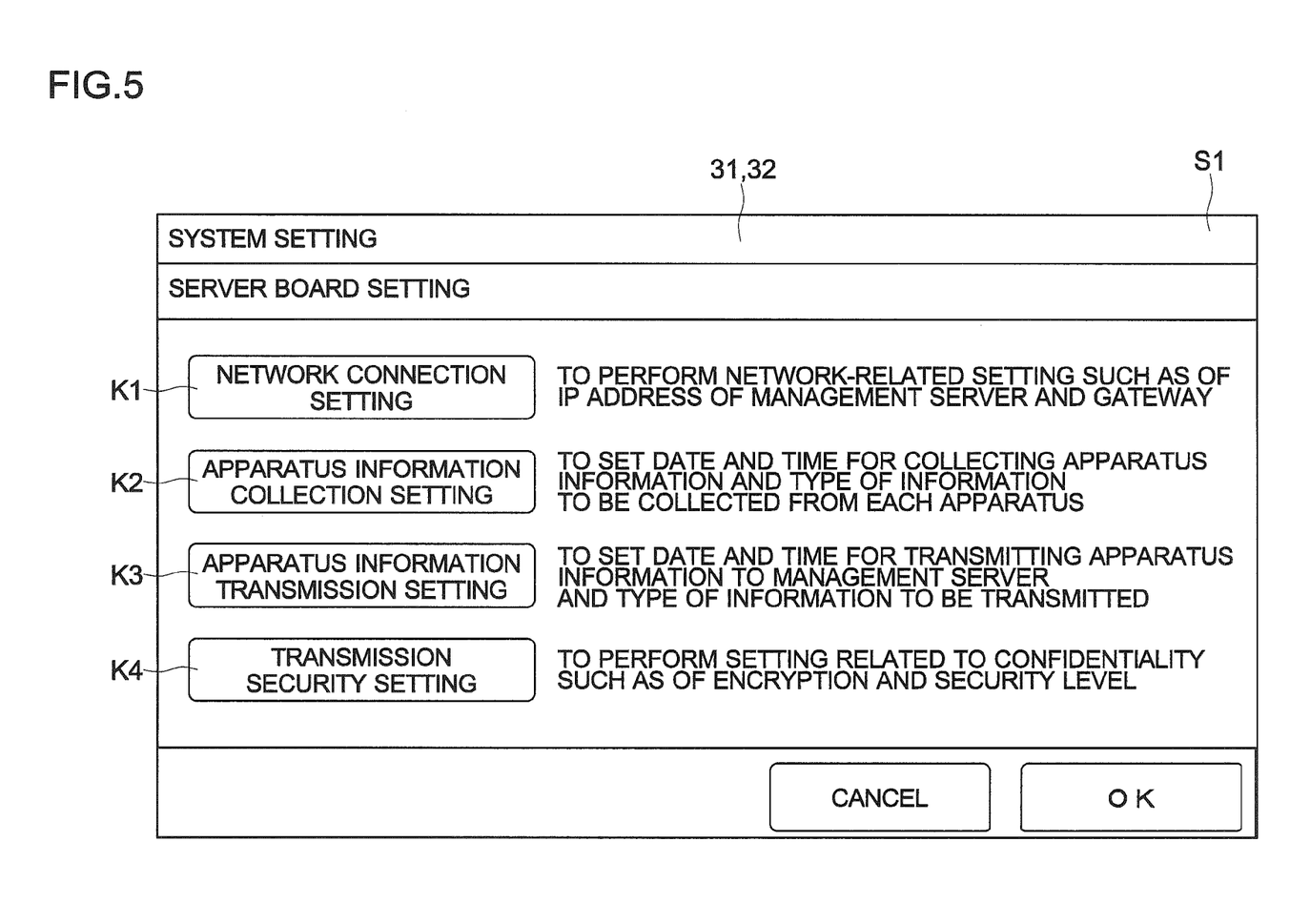
FIG. 5 is a diagram showing one example of an operation setting screen of a server board according to the embodiment.

Next, with reference to FIG. 5, a description is given of operation setting for the server board 1 performed on the operation panel 3 according to the embodiment.

The operation panel 3 accepts setting for the server board 1 and setting related to transmission of apparatus information by the server board 1. These types of setting can be performed via an operation setting screen S1 displayed on the display panel 31. In accordance with setting performed on the operation panel 3, the server board 1 transmits apparatus information to the management server 600.

To be specific, upon a prescribed touch operation being performed on the touch panel 32 (display panel 31), the control portion 2 performs control so that the operation setting screen S1 as shown in FIG. 5 is displayed on the display panel 31. On the operation setting screen S1, a first setting key K1, a second setting key K2, a third setting key K3, and a fourth setting key K4 are arranged.

When, based on an output of the touch panel 32, the control portion 2 has recognized an operation with respect to the first setting key K1, the control portion 2 controls the operation panel 3 so that a screen for performing setting related to connection to the external network 500 and to the management server 600 is newly displayed on the display panel 31. On the screen resulting from this switching, there can be performed basic setting related to communication connection to the external network 500 and to the management server 600, such as of an IP address of each of the server board 1 and the management server 600, a default gateway, a protocol to be used, and an interface type between the communication chip 16 and the external communication port 17. The operation panel 3 accepts the setting related to communication connection to the external network 500 and to the management server 600. Based on setting performed on the operation panel 3, the control portion 2 controls the server board 1 to communicate with the external network 500 and with the management server 600.

When, based on an output of the touch panel 32, the control portion 2 has recognized an operation with respect to the second setting key K2, the control portion 2 controls the operation panel 3 so that a screen for performing setting related to collection of apparatus information is newly displayed on the display panel 31. On the screen resulting from this switching, there can be performed setting related to collection of apparatus information such as of, among apparatuses connected to the LAN 200, one(s) from which collection is to be made, a type of apparatus information to be collected from the collection object apparatus 400, and a date and time for collecting apparatus information. The operation panel 3 accepts the setting that determines a collection object apparatus(es) from which apparatus information is to be collected, the setting that determines a type of apparatus information to be collected, and the setting that determines a collection date and time. On the date and time thus set, the control portion 2 controls the communication control portion 7 to collect, from the collection object apparatus(es) thus set, the type of apparatus information thus set to be collected.

When, based on an output of the touch panel 32, the control portion 2 has recognized an operation with respect to the third setting key K3, the control portion 2 controls the operation panel 3 so that a screen for performing setting related to transmission of apparatus information is newly displayed on the display panel 31. On the screen resulting from this switching, there can be performed setting related to transmission of apparatus information such as of a type of apparatus information to be transmitted as apparatus information to the management server 500 and a date and time (timing) for transmitting apparatus information. The operation panel 3 accepts the setting that determines a type of apparatus information to be transmitted to the management server 600 and the setting that determines a date and time for transmitting apparatus information to the management server 600. On the transmission date and time thus set, the control portion 2 controls the server board 1 to transmit, toward the management server 600, the type of apparatus information thus set to be transmitted.

When, based on an output of the touch panel 32, the control portion 2 has recognized an operation with respect to the fourth setting key K4, the control portion 2 controls the operation panel 3 so that a screen for performing setting related to security in transmitting apparatus information is newly displayed on the display panel 31. On the screen resulting from this switching, there can be performed setting related to safety and confidentiality of apparatus information to be transmitted, such as of whether or not the information is encrypted, an encryption key to be used, and an encryption scheme. The operation panel 3 accepts the setting related to encryption such as of, in transmitting apparatus information, whether or not the information is encrypted, an encryption key to be used, and an encryption scheme. The control portion 2 controls the server board 1 to transmit apparatus information toward the management server 600 by using the transmission scheme thus set to be used for transmission.

For example, when setting to transmit apparatus information in an encrypted form has been performed on the operation panel 3, the control portion 2 controls the server board 1 to transmit encrypted apparatus information toward the management server 600 by using the encryption scheme thus set.

As described above, the image forming apparatus (multi-functional peripheral 100) according to the embodiment includes the extension connection portion 8, the server board 1, the communication control portion 7, and the control portion 2. The extension connection portion 8 is a portion for mounting a board thereto. The server board 1 is mounted to the extension connection portion 8, includes the external communication port 17 and the circuit that is used for communication with the exterior (communication chip 16), and communicates, via the external communication port 17, with the management server 600 that is provided at the exterior. The communication control portion 7 includes the internal communication port 77 connecting to the LAN 200 that is a network different from a network to which the server board 1 is connected, and communicates with the collection object apparatus 400 that is connected to the LAN 200 and is a printing apparatus from which information is to be collected. The control portion 2 performs control so that the communication control portion 7 collects predetermined apparatus information from the collection object apparatus 400 and so that the server board 1 transmits the apparatus information thus collected toward the management server 600.

Furthermore, the present disclosure can also be regarded as relating to the server board 1. To be specific, the server board 1 according to the embodiment is mounted to the extension connection portion 8 that is a portion for mounting a board thereto and is provided in the image forming apparatus (multi-functional peripheral 100). Furthermore, the server board 1 includes the external communication port 17 and the circuit that is used for communication with the exterior (communication chip 16). The server board 1 communicates, via the external communication port 17, with the management server 600 that is provided at the exterior. Furthermore, the server board 1 transmits, toward the management server 600, predetermined apparatus information collected, by the image forming apparatus to which the server board 1 is mounted, from the collection object apparatus 400 that is communicable therewith by way of the LAN 200.

According to the image forming apparatus (multi-functional peripheral 100) and the server board 1 of the above-described embodiment, merely by mounting the server board 1 to the extension connection portion 8 (slot), it is possible to impart, to an image forming apparatus that is one of image forming apparatuses in the LAN 200 and originally has no server function, a server function of collecting apparatus information on each of the image forming apparatuses connected to the LAN 200 and transmitting the apparatus information thus collected to the external management server 600. In other words, an image forming apparatus can be easily expanded in function. Compared with a stationary server, the server board 1 has none of a large housing, a power source device, and a display. Compared with a case of providing an independent stationary server that performs information collection and information transmission to the external management server 600, a cost can be suppressed. Furthermore, since the server board 1 is mounted to the image forming apparatus, compared with a case of independently providing a server, a required installation space is substantially reduced. Furthermore, it is not imperative that all the image forming apparatuses have the server function. Accordingly, it is not required that hardware and software for realizing the server function be pre-integrated into all the image forming apparatuses, and thus a manufacturing cost of an image forming apparatus also can be suppressed.

Furthermore, the communication control portion 7 performs collection of apparatus information from the collection object apparatus 400 (any other image forming apparatus) connected to the LAN 200, and via the port provided in the server board 1, the apparatus information is transmitted to the external management server 600. That is, two ports are used. The external network and the LAN 200, therefore, are not directly connected to each other. Thus, an external intrusion into the in-house LAN 200 can be made difficult.

Furthermore, the server board 1 includes the information memory 15 that stores collected apparatus information in a nonvolatile manner. Among the collected pieces of apparatus information, the server board 1 transmits, to the management server 600, only one(s) predetermined as information that can be transmitted to the exterior.

By this configuration, it is possible to transmit only a piece(s) of apparatus information predetermined as information that can be transmitted to the exterior (a piece(s) of information excluding information determined not to be transmitted to the exterior from the viewpoint of confidentiality). This can prevent leakage of confidential matters. For example, for the purpose of data backup, contents such as image data used for a job and personal information such as an address book are collected, but such contents are set not to be transmitted to the management server 600.

Generally, in many cases, a server is always kept in a power on state. It can be said that this makes a server more vulnerable to an external attack. As a solution to this, the image forming apparatus (multi-functional peripheral 100) according to the embodiment includes the power supply portion 9 that performs power supply to each of portions included in the image forming apparatus. Upon a predetermined transition condition being satisfied, in order to bring the image forming apparatus to the power saving mode, the power supply portion 9 shuts off power supply to the predetermined supply shut-off portion that includes the control portion 2. Further, upon a predetermined recovery condition being satisfied in the power saving mode, in order to bring the image forming apparatus to the normal mode, the power supply portion 9 resumes power supply to the supply shut-off portion. Regarding the server board 1, during the power saving mode, the power supply portion 9 supplies power to, among the plurality of circuits included in the server board 1, one(s) (communication chip 16) that recognize(s) that a command has been received from the management server 600. In a state where supplied power is limited due to the power saving mode, the server board 1 does not transmit apparatus information to the management server 600.

By this configuration, during the power saving mode, transmission of information is disabled and thus can reduce a possibility of information leakage. Meanwhile, even in the power saving mode, power supply to part of the server board 1 is performed, and thus even in the power saving mode, it is possible to recognize a command from the management server 600 and to react thereto. Furthermore, during the power saving mode, power consumed in the server board 1 can be reduced, and thus it is possible to suppress power consumption, during the power saving mode, of the image forming apparatus (multi-functional peripheral 100) as a whole.

Furthermore, during the power saving mode, when the server board 1 has received a transmission request of apparatus information from the management server 600, in order to bring the image forming apparatus (multi-functional peripheral 100) to the normal mode, the power supply portion 9 resumes power supply to the supply shut-off portion. In a state where recovery to the normal mode has been achieved, the server board 1 transmits apparatus information to the management server 600. By this configuration, using a signal from the external management server 600 as a trigger, power supply to the entire server board 1 can be resumed. That is, a mode of the image forming apparatus (multi-functional peripheral 100) can be remotely controlled.

Furthermore, the image forming apparatus (multi-functional peripheral 100) according to the embodiment includes the operation panel 3 that accepts setting for the server board 1 and setting related to transmission of apparatus information by the server board 1. In accordance with setting performed on the operation panel 3, the server board 1 transmits apparatus information to the management server 600. By this configuration, without the need for a server display or keyboard, setting of an operation of the server board 1 and an operation with respect to the server board 1 can be performed on the operation panel 3 with which the image forming apparatus (multi-functional peripheral 100) is equipped.

While the foregoing has described the embodiment of the present disclosure, the scope of the present disclosure is not limited thereto, and the present disclosure can be implemented by adding various modifications thereto without departing from the spirit of the disclosure.

What is claimed is:

1. An image forming apparatus, comprising:
   an extension connection portion for mounting a board thereto;
   a server board that is mounted to the extension connection portion, includes an external communication port and a circuit that is used for communication with an exterior, and communicates, via the external communication port, with a management server that is provided at the exterior;
   a communication control portion that includes an internal communication port connecting to a local network different from a network to which the server board is connected, and communicates with a collection object apparatus that is connected to the local network and from which information is to be collected;
   a control portion that performs control so that the communication control portion collects predetermined apparatus information from the collection object apparatus and so that the server board transmits the apparatus information thus collected toward the management server; and
   a power supply portion that performs power supply to each of portions included in the image forming apparatus,
   wherein, upon a predetermined transition condition being satisfied, the power supply portion shuts off power supply to a predetermined supply shut-off portion that includes the control portion so that the image forming apparatus is brought to a power saving mode,
   upon a predetermined recovery condition being satisfied in the power saving mode, the power supply portion resumes power supply to the supply shut-off portion so that the image forming apparatus is brought to a normal mode, during the power saving mode, the power supply portion supplies power only to, among a plurality of circuits included in the server board, one that recognizes that a command has been received from the management server, and in a state where supplied power is limited due to the power saving mode, the server board does not transmit the apparatus information to the management server.

2. The image forming apparatus according to claim 1, wherein:

the server board comprises an information memory that stores the apparatus information thus collected in a nonvolatile manner, and the server board transmits, to the management server, among pieces of the apparatus information thus collected, one that is predetermined as information that can be transmitted to the exterior.

3. The image forming apparatus according to claim 1, wherein:

during the power saving mode, when the server board has received a transmission request of the apparatus information from the management server, the power supply portion resumes power supply to the supply shut-off portion so that the image forming apparatus is brought to the normal mode, and in a state where recovery to the normal mode has been achieved, the server board transmits the apparatus information to the management server.

4. The image forming apparatus according to claim 1, further comprising:

an operation panel that accepts setting related to encryption in transmitting the apparatus information, wherein the control portion controls the server board to transmit, by using a set encryption scheme, the apparatus information in an encrypted form toward the management server.

5. An image forming apparatus, comprising:

an extension connection portion for mounting a board thereto;

a server board that is mounted to the extension connection portion, includes an external communication port and a circuit that is used for communication with an exterior, and communicates, via the external communication port, with a management server that is provided at the exterior;

a communication control portion that includes an internal communication port connecting to a local network different from a network to which the server board is connected, and communicates with a collection object apparatus that is connected to the local network and from which information is to be collected;

a control portion that performs control so that the communication control portion collects predetermined apparatus information from the collection object apparatus and so that the server board transmits the apparatus information thus collected toward the management server; and an operation panel that accepts setting for the server board and setting related to transmission of the apparatus information from the server board, wherein, in accordance with setting performed on the operation panel, the server board transmits the apparatus information to the management server.

6. The image forming apparatus according to claim 5, wherein:

the operation panel accepts setting that determines a type of the apparatus information to be transmitted to the management server and setting that determines a date and time for transmitting the apparatus information to the management server, and on the transmission date and time thus set, the control portion controls the server board to transmit, toward the management server, the type of the apparatus information thus set.

7. The image forming apparatus according to claim 5, wherein:

the server board comprises an information memory that stores the apparatus information thus collected in a nonvolatile manner, and the server board transmits, to the management server, among pieces of the apparatus information thus collected, one that is predetermined as information that can be transmitted to the exterior.

8. The image forming apparatus according to claim 5, further comprising:

an operation panel that accepts setting related to encryption in transmitting the apparatus information, wherein the control portion controls the server board to transmit, by using a set encryption scheme, the apparatus information in an encrypted form toward the management server.

9. An image forming apparatus, comprising:

an extension connection portion for mounting a board thereto;

a server board that is mounted to the extension connection portion, includes an external communication port and a circuit that is used for communication with an exterior, and communicates, via the external communication port, with a management server that is provided at the exterior;

a communication control portion that includes an internal communication port connecting to a local network different from a network to which the server board is connected, and communicates with a collection object apparatus that is connected to the local network and from which information is to be collected;

a control portion that performs control so that the communication control portion collects predetermined apparatus information from the collection object apparatus and so that the server board transmits the apparatus information thus collected toward the management server; and an operation panel that accepts setting that determines, as the collection object apparatus, an apparatus from which the apparatus information is to be collected, setting that determines a type of the apparatus information to be collected, and setting that determines a collection date and time, wherein on the collection date and time thus set, the control portion controls the communication control portion to collect, from the apparatus as the collection object apparatus thus set, the type of the apparatus information thus set.

10. The image forming apparatus according to claim 9, wherein:

the server board comprises an information memory that stores the apparatus information thus collected in a nonvolatile manner, and the server board transmits, to the management server, among pieces of the apparatus information thus collected, one that is predetermined as information that can be transmitted to the exterior.

11. The image forming apparatus according to claim 9, further comprising:
an operation panel that accepts setting related to encryption in transmitting the apparatus information,
wherein the control portion controls the server board to transmit, by using a set encryption scheme, the apparatus information in an encrypted form toward the management server.

\* \* \* \* \*